US011822563B2

(12) United States Patent
Kaveti et al.

(10) Patent No.: US 11,822,563 B2
(45) Date of Patent: Nov. 21, 2023

(54) SCORING POTENTIAL ACTIONS FOR MACHINE LEARNING BASED RECOMMENDATIONS

(71) Applicant: Intuit Inc., Mountain View, CA (US)

(72) Inventors: Naveen Kumar Kaveti, Hyderabad (IN); Sravya Sri Garapati, Andhra Pradesh (IN); Vignesh Thirukazhukundram Subrahmaniam, Bangalore (IN)

(73) Assignee: Intuit Inc., Mountain View, CA (US)

( * ) Notice: Subject to any disclaimer, the term of this patent is extended or adjusted under 35 U.S.C. 154(b) by 84 days.

(21) Appl. No.: 17/387,115

(22) Filed: Jul. 28, 2021

(65) Prior Publication Data
US 2023/0031111 A1 Feb. 2, 2023

(51) Int. Cl.
*G06F 16/2458* (2019.01)
*G06N 20/00* (2019.01)
(52) U.S. Cl.
CPC ......... *G06F 16/2474* (2019.01); *G06N 20/00* (2019.01)
(58) Field of Classification Search
None
See application file for complete search history.

(56) References Cited

U.S. PATENT DOCUMENTS

| 10,600,004 | B1* | 3/2020 | Misko | G06N 3/084 |
| 10,818,293 | B1* | 10/2020 | Orkin | G06F 16/9038 |
| 2017/0161337 | A1* | 6/2017 | Yao | G06F 16/248 |
| 2019/0295004 | A1* | 9/2019 | Chaturapruek | G06T 11/60 |
| 2019/0313155 | A1* | 10/2019 | Becker | H04N 21/44213 |
| 2021/0019325 | A1* | 1/2021 | Edge | G06F 16/953 |

\* cited by examiner

*Primary Examiner* — Giuseppi Giuliani
(74) *Attorney, Agent, or Firm* — Paradice & Li LLP

(57) ABSTRACT

Systems and methods for scoring potential actions are disclosed. An example method may be performed by one or more processors of a system and include training a machine learning model based at least in part on a sequential database and retention data, identifying an action subsequence executed by a user, generating, for each of a plurality of potential actions, using the machine learning model, a first value indicating a probability that the user will execute the potential action immediately after executing the action subsequence, a second value indicating a probability that the user will continue to use the system if the user executes the potential action immediately after executing the action subsequence, and a confidence score indicating a likelihood that recommending the potential action to the user will result in the user continuing to use the system, the confidence score generated based on the first value and the second value.

17 Claims, 12 Drawing Sheets

| User ID 802 | Action ID 804 | Action Time 806 | Start Date 808 | Action Name 810 | ... |
|---|---|---|---|---|---|
| 53798557 | 102483000 | 2019-08-09 07:21:21 | 2019-08-08 | Add Expense | ... |
| 53798557 | 102483006 | 2019-08-09 07:58:02 | 2019-08-08 | Add Bill | ... |
| 53798557 | 102483006 | 2019-08-09 08:11:22 | 2019-08-08 | Add Bill | ... |
| 53798557 | 102483022 | 2019-08-09 09:03:50 | 2019-08-08 | Add Vendor | ... |

*Figure 8*

| User ID 902 | Action Sequence 904 | |
|---|---|---|
| | ⋮ | ⋮ |
| 108926873 | 1024830400\|1024830400\|1024830021\|1024830021\|1024830002 | |
| 154275242 | 1024830400\|1024830400\|1024830001\|1024830018\|1024830000 | |
| 1511470170 | 1024830400\|1024830400\|1024830002\|1024830003\|1024830040 | |
| 1572235180 | 1024830400\|1024830400\|1024830012\|1024830006\|1024830006 | |
| | ⋯ | |

| Action Sequence 1002 | Instances 1004 | ... |
|---|---|---|
| 102483006 102483009 102483001 102483000 | 13406 | ... |
| 102483001 102483000 102483006 102483009 | 13387 | ... |
| 102483001 102483000 102483022 102483003 | 13210 | ... |
| 102483006 102483009 102483000 102483001 | 13148 | ... |

*Figure 10*

| User ID 1102 | Predicted Action 1104 | First Value 1106 | Second Value 1108 | Actual Action 1110 | Confidence Score 1112 | Action Name 1114 | ... |
|---|---|---|---|---|---|---|---|
| 129493939 | 102483000 | 0.683306388 | 1.61594E-05 | 102483000 | 0.000011 | Add Expense | ... |
| 131708454 | 102483003 | 0.466064082 | 0.000197446 | 102483037 | 0.000092 | Add Check | ... |
| 131708454 | 102483000 | 0.360623549 | 0.000174136 | 102483037 | 0.000063 | Add Expense | ... |
| 131708454 | 102483001 | 0.191787013 | 4.54957E-05 | 102483037 | 0.000009 | Add Deposit | ... |
| 131708454 | 102483022 | 0.0575111813 | 1.21959E-05 | 102483037 | 0.000001 | Add Vendor | ... |
| 85213578 | 102483000 | 0.42739396 | 3.90349E-06 | 102483002 | 0.000002 | Add Expense | ... |
| 85661281 | 102483000 | 0.791688384 | 0.013570631 | 102483001 | 0.010744 | Add Expense | ... |
| 85661281 | 102483001 | 0.424642624 | 0.006585892 | 102483001 | 0.002797 | Add Deposit | ... |

*Figure 11*

SCORING POTENTIAL ACTIONS FOR MACHINE LEARNING BASED RECOMMENDATIONS

TECHNICAL FIELD

This disclosure relates generally to machine learning based recommendation systems, and specifically to scoring potential actions for machine learning based recommendations.

DESCRIPTION OF RELATED ART

Many companies and institutions offer computer-based systems that provide a variety of user features, such as an invoice management feature. Over time, new features may be added that provide new functionality or that enhance the functionality of previous features, such as an interface for adding multiple (batch) invoices at once. Users already familiar with the previous features (such as veteran users) may quickly discover the new features and learn how to access and use the new features without much user guidance.

In contrast, users unfamiliar with the previous features (such as new users) may have some difficulty discovering, accessing, and/or using the new features. For example, in an attempt to access a new interface for adding multiple invoices, a user may execute various system actions that do not ultimately direct the user to the new interface. If the new user is unable to access the new interface within a reasonable amount of time, the new user may become frustrated and abandon the system. As another example, a new user may be entirely unaware of the new interface, spend considerable time and effort adding invoices one-by-one, become frustrated, and abandon the system.

To address these issues, many systems offer various user guidance, such as tutorials and frequently asked questions (FAQs) designed to educate users about the new features. Unfortunately, such user guidance tends to be static and impersonal, and many users still have difficulty discovering, accessing, or using features, and abandon the system.

Therefore, it is desirable to generate more effective user guidance that can better help users with discovering, accessing, and using various system features.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method for scoring potential actions. An example method may include generating a sequential database indicating historical actions executed by historical users, retrieving retention data indicating whether the historical users continued to use the system after executing the historical actions, providing the sequential database and the retention data to a machine learning model, identifying an action subsequence executed by a first user, and generating, for each of a plurality of potential actions, using the machine learning model, a first value indicating a probability that the first user will execute the potential action immediately after executing the action subsequence, a second value indicating a probability that the first user will continue to use the system if the first user executes the potential action immediately after executing the action subsequence, and a confidence score indicating a likelihood that recommending the potential action to the first user will result in the first user continuing to use the system, the confidence score generated based on the first value and the second value.

In some implementations, the method may further include extracting historical action sequences from the sequential database, where the identified action subsequence is included within the historical action sequences, and determining, for each of the historical action sequences, a number of instances that the historical action sequence appears in the sequential database, where generating the first value and the second value is based at least in part on the numbers of instances.

In some other implementations, the method may further include generating a validation database indicating recent action sequences executed by recent users, where the identified action subsequence is included within the recent action sequences. In some aspects, the validation database indicates an actual action executed by the first user immediately after executing the action subsequence, and the method may further include providing the validation database to the machine learning model, and determining an accuracy of the machine learning model based at least in part on the validation database.

In some implementations, generating the first value includes determining a first number of instances that the action subsequence appears in the sequential database, determining a second number of instances that the potential action appears immediately after the action subsequence in the sequential database, and determining, based on the first number of instances and the second number of instances, the probability that the first user will execute the potential action immediately after executing the action subsequence. In some implementations, generating the second value includes determining, based on the retention data, a first percentage of the historical users that continued to use the system after executing the potential action immediately after executing the action subsequence, determining, based on the retention data, a second percentage of the historical users that did not continue to use the system after executing the potential action immediately after executing the action subsequence, and determining, based on the first percentage and the second percentage, the probability that the first user will continue to use the system if the first user executes the potential action immediately after executing the action subsequence.

In some other implementations, the method may further include identifying current action sequences being executed by the first user, where the identified action subsequence is included within the current action sequences. In some implementations, the method may further include determining a highest scoring action of the plurality of potential actions based on the confidence scores, generating at least one recommended action for the first user, the at least one recommended action including the highest scoring action, providing the at least one recommended action to the first user, receiving, from the first user, an indication of a selected action of the at least one recommended action, and redirecting the first user to an interface for executing the selected action.

Another innovative aspect of the subject matter described in this disclosure can be implemented in a system for scoring potential actions. An example system may include one or more processors and a memory storing instructions for execution by the one or more processors. Execution of the instructions may cause the system to generate a sequential database indicating historical actions executed by historical users, retrieve retention data indicating whether the historical users continued to use the system after executing the historical actions, provide the sequential database and the retention data to a machine learning model, identify an action subsequence executed by a first user, and generate, for each of a plurality of potential actions, using the machine learning model, a first value indicating a probability that the first user will execute the potential action immediately after executing the action subsequence, a second value indicating a probability that the first user will continue to use the system if the first user executes the potential action immediately after executing the action subsequence, and a confidence score indicating a likelihood that recommending the potential action to the first user will result in the first user continuing to use the system, the confidence score generated based on the first value and the second value.

In some implementations, execution of the instructions may further cause the system to extract historical action sequences from the sequential database, where the identified action subsequence is included within the historical action sequences, and determine, for each of the historical action sequences, a number of instances that the historical action sequence appears in the sequential database, where generating the first value and the second value is based at least in part on the numbers of instances.

In some other implementations, execution of the instructions may further cause the system to generate a validation database indicating recent action sequences executed by recent users, where the identified action subsequence is included within the recent action sequences. In some aspects, the validation database indicates an actual action executed by the first user immediately after executing the action subsequence, and execution of the instructions may further cause the system to provide the validation database to the machine learning model, and determine an accuracy of the machine learning model based at least in part on the validation database.

In some implementations, generating the first value includes determining a first number of instances that the action subsequence appears in the sequential database, determining a second number of instances that the potential action appears immediately after the action subsequence in the sequential database, and determining, based on the first number of instances and the second number of instances, the probability that the first user will execute the potential action immediately after executing the action subsequence. In some implementations, generating the second value includes determining, based on the retention data, a first percentage of the historical users that continued to use the system after executing the potential action immediately after executing the action subsequence, determining, based on the retention data, a second percentage of the historical users that did not continue to use the system after executing the potential action immediately after executing the action subsequence, and determining, based on the first percentage and the second percentage, the probability that the first user will continue to use the system if the first user executes the potential action immediately after executing the action subsequence.

In some other implementations, execution of the instructions may further cause the system to identify current action sequences being executed by the first user, where the identified action subsequence is included within the current action sequences. In some implementations, execution of the instructions may further cause the system to determine a highest scoring action of the plurality of potential actions based on the confidence scores, generate at least one recommended action for the first user, the at least one recommended action including the highest scoring action, provide the at least one recommended action to the first user, receive, from the first user, an indication of a selected action of the at least one recommended action, and redirect the first user to an interface for executing the selected action.

Another innovative aspect of the subject matter described in this disclosure can be implemented as a non-transitory computer-readable medium storing instructions that, when executed by one or more processors of a system for scoring potential actions, cause the system to perform operations. Example operations may include generating a sequential database indicating historical actions executed by historical users, retrieving retention data indicating whether the historical users continued to use the system after executing the historical actions, providing the sequential database and the retention data to a machine learning model, identifying an action subsequence executed by a first user, and generating, for each of a plurality of potential actions, using the machine learning model, a first value indicating a probability that the first user will execute the potential action immediately after executing the action subsequence, a second value indicating a probability that the first user will continue to use the system if the first user executes the potential action immediately after executing the action subsequence, and a confidence score indicating a likelihood that recommending the potential action to the first user will result in the first user continuing to use the system, the confidence score generated based on the first value and the second value.

Another innovative aspect of the subject matter described in this disclosure can be implemented as a method for scoring potential actions. An example method may include extracting, from a validation database, a recent action sequence executed by a recent user, identifying, within the recent action sequence, a recent action subsequence executed by the recent user, where the validation database indicates an actual action executed by the recent user immediately after executing the action subsequence, generating, for each respective potential action of a plurality of potential actions, using a trained machine learning model, a first value indicating a probability that the recent user will execute the respective potential action immediately after executing the action subsequence, a second value indicating a probability that the recent user will continue to use the system if the recent user executes the respective potential action immediately after executing the action subsequence, and a confidence score indicating a likelihood that recommending the respective potential action to the recent user will result in the recent user continuing to use the system, the confidence score generated based on the first value and the second value, and determining an accuracy of the trained machine learning model based at least in part on the actual action executed by the recent user and the generated confidence scores.

In some implementations, generating the first value includes determining a first number of instances that the recent action subsequence appears in a sequential database indicating historical actions executed by historical users, determining a second number of instances that the respective potential action appears immediately after the recent action subsequence in the sequential database, and determining, based on the first number of instances and the second number of instances, the probability that the recent user will execute the respective potential action immediately after executing the recent action subsequence, and generating the second value includes determining, based on retention data indicating whether the historical users continued to use the system after executing the historical actions, a first percentage of the historical users that continued to use the system after executing the respective potential action immediately after executing the recent action subsequence, determining, based on the retention data, a second percentage of the historical users that did not continue to use the system after executing the respective potential action immediately after executing the recent action subsequence, and determining, based on the first percentage and the second percentage, the probability that the recent user will continue to use the system if the recent user executes the respective potential action immediately after executing the recent action subsequence.

Another innovative aspect of the subject matter described in this disclosure can be implemented in a system for scoring potential actions. An example system may include one or more processors and a memory storing instructions for execution by the one or more processors. Execution of the instructions may cause the system to extract, from a validation database, a recent action sequence executed by a recent user, identify, within the recent action sequence, a recent action subsequence executed by the recent user, where the validation database indicates an actual action executed by the recent user immediately after executing the action subsequence, generate, for each respective potential action of a plurality of potential actions, using a trained machine learning model, a first value indicating a probability that the recent user will execute the respective potential action immediately after executing the action subsequence, a second value indicating a probability that the recent user will continue to use the system if the recent user executes the respective potential action immediately after executing the action subsequence, and a confidence score indicating a likelihood that recommending the respective potential action to the recent user will result in the recent user continuing to use the system, the confidence score generated based on the first value and the second value, and determine an accuracy of the trained machine learning model based at least in part on the actual action executed by the recent user and the generated confidence scores.

In some implementations, generating the first value includes determining a first number of instances that the recent action subsequence appears in a sequential database indicating historical actions executed by historical users, determining a second number of instances that the respective potential action appears immediately after the recent action subsequence in the sequential database, and determining, based on the first number of instances and the second number of instances, the probability that the recent user will execute the respective potential action immediately after executing the recent action subsequence, and generating the second value includes determining, based on retention data indicating whether the historical users continued to use the system after executing the historical actions, a first percentage of the historical users that continued to use the system after executing the respective potential action immediately after executing the recent action subsequence, determining, based on the retention data, a second percentage of the historical users that did not continue to use the system after executing the respective potential action immediately after executing the recent action subsequence, and determining, based on the first percentage and the second percentage, the probability that the recent user will continue to use the system if the recent user executes the respective potential action immediately after executing the recent action subsequence.

Another innovative aspect of the subject matter described in this disclosure can be implemented as a non-transitory computer-readable medium storing instructions that, when executed by one or more processors of a system for scoring potential actions, cause the system to perform operations. Example operations may include extracting, from a validation database, a recent action sequence executed by a recent user, identifying, within the recent action sequence, a recent action subsequence executed by the recent user, where the validation database indicates an actual action executed by the recent user immediately after executing the action subsequence, generating, for each respective potential action of a plurality of potential actions, using a trained machine learning model, a first value indicating a probability that the recent user will execute the respective potential action immediately after executing the action subsequence, a second value indicating a probability that the recent user will continue to use the system if the recent user executes the respective potential action immediately after executing the action subsequence, and a confidence score indicating a likelihood that recommending the respective potential action to the recent user will result in the recent user continuing to use the system, the confidence score generated based on the first value and the second value, and determining an accuracy of the trained machine learning model based at least in part on the actual action executed by the recent user and the generated confidence scores.

Another innovative aspect of the subject matter described in this disclosure can be implemented as a method for scoring potential actions. An example method may include extracting a current action sequence from current actions being executed by a current user, identifying, within the current action sequence, a current action subsequence executed by the current user, generating, for each respective potential action of a plurality of potential actions, using a trained machine learning model, a first value indicating a probability that the current user will execute the respective potential action immediately after executing the current action subsequence, a second value indicating a probability that the current user will continue to use the system if the current user executes the respective potential action immediately after executing the current action subsequence, and a confidence score indicating a likelihood that recommending the respective potential action to the current user will result in the current user continuing to use the system, the confidence score generated based on the first value and the second value, and generating at least one recommended action for the current user based on the confidence scores.

In some implementations, the method may further include determining a highest scoring action of the plurality of potential actions based on the confidence scores, where the at least one recommended action includes the highest scoring action, providing the at least one recommended action to the current user, receiving, from the current user, an indication of a selected action of the at least one recommended action, and redirecting the current user to an interface for executing the selected action.

Another innovative aspect of the subject matter described in this disclosure can be implemented in a system for scoring potential actions. An example system may include one or more processors and a memory storing instructions for execution by the one or more processors. Execution of the instructions may cause the system to extract a current action sequence from current actions being executed by a current user, identify, within the current action sequence, a current action subsequence executed by the current user, generate, for each respective potential action of a plurality of potential actions, using a trained machine learning model, a first value indicating a probability that the current user will execute the respective potential action immediately after executing the current action subsequence, a second value indicating a probability that the current user will continue to use the system if the current user executes the respective potential action immediately after executing the current action subsequence, and a confidence score indicating a likelihood that recommending the respective potential action to the current user will result in the current user continuing to use the system, the confidence score generated based on the first value and the second value, and generate at least one recommended action for the current user based on the confidence scores.

In some implementations, execution of the instructions may further cause the system to determine a highest scoring action of the plurality of potential actions based on the confidence scores, where the at least one recommended action includes the highest scoring action, providing the at least one recommended action to the current user, receive, from the current user, an indication of a selected action of the at least one recommended action, and redirect the current user to an interface for executing the selected action.

Another innovative aspect of the subject matter described in this disclosure can be implemented as a non-transitory computer-readable medium storing instructions that, when executed by one or more processors of a system for scoring potential actions, cause the system to perform operations. Example operations may include extracting a current action sequence from current actions being executed by a current user, identifying, within the current action sequence, a current action subsequence executed by the current user, generating, for each respective potential action of a plurality of potential actions, using a trained machine learning model, a first value indicating a probability that the current user will execute the respective potential action immediately after executing the current action subsequence, a second value indicating a probability that the current user will continue to use the system if the current user executes the respective potential action immediately after executing the current action subsequence, and a confidence score indicating a likelihood that recommending the respective potential action to the current user will result in the current user continuing to use the system, the confidence score generated based on the first value and the second value, and generating at least one recommended action for the current user based on the confidence scores.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 8 shows an example depiction of user actions data, according to some implementations.

FIG. 9 shows an example depiction of user action sequences data, according to some implementations.

FIG. 10 shows an example depiction of action sequence count data, according to some implementations.

FIG. 11 shows an example depiction of model output data, according to some implementations.

Like numbers reference like elements throughout the drawings and specification.

DETAILED DESCRIPTION

Figure 1:
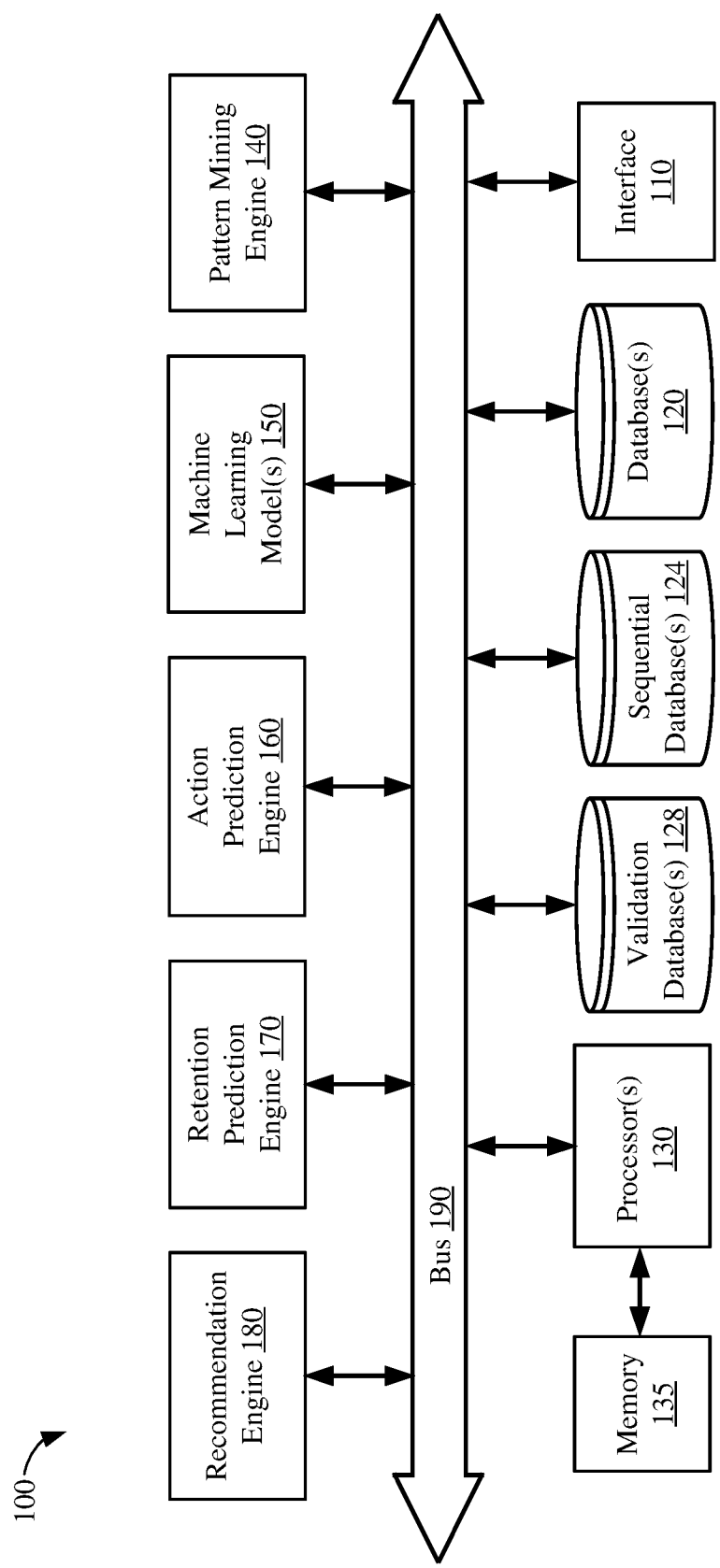
FIG. 1 shows a machine learning (ML) augmented recommendation system, according to some implementations.

As described above, computer-based systems may offer a variety of system features, and it is desirable for such systems to have user guidance that can effectively help users discover, access, and use such features. Implementations of the subject matter described in this disclosure may be used in providing machine learning based user guidance, such as identifying actions executed by users and recommending next actions most likely to be relevant to the user and successful in retaining the user. Specifically, implementations of the subject matter described in this disclosure may be used in training one or more machine learning (ML) models to predict, for each of a plurality of potential actions, a likelihood that a user will continue to use the system if the user executes the potential action immediately after executing a particular, chronological series of one or more actions ("action sequence"). In this manner, implementations of the subject matter described in this disclosure may provide one or more benefits such as improving user experience, identifying optimal user workflows, generating personalized system action recommendations in real-time, and increasing user retention rate.

In some implementations, the confidence scores may be generated based on predicting, using the machine learning models 150, a likelihood that the user will execute the potential action immediately after executing the particular action sequence based on a sequential database indicating action sequences executed by historical users, and predicting, using the machine learning models 150, a likelihood that the user will continue to use the system if the user executes the potential action immediately after executing the particular action sequence based on retention data indicating whether historical users continued to use the system after executing particular action sequences.

For purposes of discussion herein, a "system" may refer to a system for generating recommended actions for users of a product or service associated with the system. In some implementations, the product or service may be related to financial management. Additionally or alternatively, the system may be the product or service, and generating recommended actions may be one feature provided by the product or service.

For purposes of discussion herein, a "user" may refer to a user or customer of the system, and a user may "use the system" by executing one or more system actions. As used herein for a system remote to a user, communicating with a "user" or receiving or providing traffic from or to a "user" may refer to communicating with a device of the user (such as a smartphone, tablet, personal computer, or other suitable electronic device) or a financial institution acting on behalf of the user. As used herein, "executing a system action" may refer to a user activating (such as clicking on) an interface element (such as an "Add Invoice" button) that causes the system to provide the user with—or otherwise redirect the user to—a particular interface. As used herein, "continuing to use the system" may refer to a user accessing or otherwise interacting with the system within a particular period of time (e.g., 90 days) after executing a system action. As used herein, a "historical user" may refer to a user that used the system during a time period associated with training the system (e.g., 2-3 years ago), a "recent user" may refer to a user that used the system during a time period associated with validating the system (e.g., 1-2 years ago), and a "current user" may refer to a user that is using the system in real-time.

Non-limiting examples of system actions may include "Add Expense," "Add Bill," "Add Vendor," "Add Credit Card Credit," "Add Check," "Add Estimate," "Add Bill Payment," "Add Deposit," "Add Customer," "Add Transfer," "Add Account," or any another user-executable function provided by the system, whether or not related to financial management. As used herein, a "historical action" may refer to an action executed by a historical user during a training period associated with the system training one or more ML models (as further described in connection with FIG. 2), a "recent action" may refer to an action executed by a recent user during a validation (or "test") period associated with the system determining an accuracy of the one or more ML models (as further described in connection with FIG. 3), and a "current action" may refer to an action being executed by a current user in real-time (as further described in connection with FIG. 4).

For purposes of discussion herein, a "potential action" or a "potential next action" may refer to a system action potentially executable by a user after the user executes at least one other system action. As used herein, an "actual action" or an "actual next action" may refer to an action that a user actually executed after executing a system action (such as during a validation period). As used herein, a "recommended action," a "recommended next action," or a "next best action" may refer to an action that the system predicts has a relatively high likelihood of resulting in the user continuing to use the system if recommended to the user after the user executes a particular action sequence. As used herein, a "selected action" or a "selected next action" may refer to a recommended action ultimately selected by a user. As used herein, a user executing a particular action "immediately" after executing a particular action sequence may refer to the particular action being the next action (in time) that the user executes after executing the particular action sequence.

As used herein, a "historical action sequence" may refer to an action sequence executed by a historical user, such as during a training period, a "recent action sequence" may refer to an action sequence executed by a recent user, such as during a validation period, and a "current action sequence" may refer to an action sequence executed by a current user, such as in real-time. As used herein, an "action subsequence" of a particular action sequence may refer to a chronological series of any number of system actions included within the particular action sequence.

Various implementations of the subject matter disclosed herein provide one or more technical solutions to the technical problem of improving the functionality of computer-based systems by incorporating ML based predictions, such as next best action recommendations. More specifically, various aspects of the present disclosure provide a unique computing solution to a unique computing problem that did not exist prior to electronic or online ML augmented recommendation systems that can predict the statistically most effective next actions for a given user in real-time. Preparing, training, and using a machine learning model cannot be performed in the human mind, much less using pen and paper. As such, implementations of the subject matter disclosed herein are not an abstract idea such as organizing human activity or a mental process that can be performed in the human mind. Moreover, by automatically enabling ML augmented action recommendations, the subject matter disclosed herein provides meaningful improvements to the performance of computer-based recommendation systems.

FIG. 1 shows a machine learning (ML) augmented recommendation system 100, according to some implementations. For simplicity, the ML augmented recommendation system 100 may be referred to herein as "the system 100." Various aspects of the system 100 disclosed herein may be applicable for scoring potential actions for ML based recommendations. The system 100 includes an interface 110, one or more databases 120, one or more sequential databases 124 (or "the sequential database 124"), one or more validation databases 128 (or "the validation database 128"), one or more processors 130, a memory 135 coupled to the processor 130, a pattern mining engine 140, one or more machine learning models 150 (or "the machine learning models 150"), an action prediction engine 160, a retention prediction engine 170, and a recommendation engine 180. In some implementations, the various components of the system 100 may be interconnected by at least a data bus 190, as depicted in the example of FIG. 1. In other implementations, the various components of the system 100 may be interconnected using other suitable signal routing resources. While the system 100 and the examples herein are described with reference to generating recommended actions using one or more machine learning models, the system 100 and aspects of the present disclosure may be used for other suitable tasks. Input data may be any suitable data used to generate predictive action data based on previous action data for improving the accuracy of a machine learning model.

The interface 110 may be one or more input/output (110) interfaces to receive input data (such as system actions executed by users) to be used in generating one or more recommended actions. The interface 110 may also be used to provide (such as to a user) one or more recommended actions generated by the system 100. The interface 110 may also be used to provide or receive other suitable information, such as computer code for updating one or more programs stored on the system 100, internet protocol requests and results, or results from the recommendation engine 180. An example interface may include a wired interface or wireless interface to the internet or other means to communicably couple with user devices, financial institution devices, or other suitable devices. For example, the interface 110 may include an interface with an ethernet cable to a modem, which is used to communicate with an internet service provider (ISP) directing traffic to and from user devices, financial institutions (such as banks, investment firms, credit card companies, etc.), and/or other parties. The interface 110 may also be used to communicate with another device within the network to which the system 100 is coupled, such as a smartphone, tablet, personal computer, or other suitable electronic device or a financial institution acting on behalf of a user. The interface 110 may also include a display, a speaker, a mouse, a keyboard, or other suitable input or output elements that allow interfacing with the system 100 by a local user or moderator.

The database 120 may store input data, such as actions and action sequences executed by users, and use the input data to generate training data, validation data, and/or real-time action recommendations. The database 120 may also store predictive values generated using the machine learning models 150, the action prediction engine 160, the retention prediction engine 170, the recommendation engine 180, one or more financial management applications, loss prevention applications, or features of the machine learning models 150, or other information associated with the system 100. In some implementations, the database 120 may include a relational database capable of presenting the information as data sets in tabular form and capable of manipulating the data sets using relational operators. The database 120 may use Structured Query Language (SQL) for querying and maintaining the database 120. The input data and the data sets described below (e.g., historical action data, recent action data, historical action sequences, recent action sequences, and so on) may be in any suitable format for processing by the system 100. For example, the data may be included in one or more JSON files or objects. In another example, the data may be in SQL compliant data sets for filtering and sorting by the system 100 (such as by processor 130).

The sequential database 124 may store data indicating historical actions and historical action sequences executed by one or more historical users that used the system 100 during a time period associated with training the system 100. For example, the system 100 may monitor clickstream data representative of historical actions executed by the historical users, and generate, based on the clickstream data, one or more sequential databases indicating the system actions, as further described in connection with FIG. 8. The sequential database 124 may be a part of or separate from the database 120. In some implementations, the system 100 may include one sequential database indicating all historical actions executed by all historical users. In some other implementations, the system 100 may generate, for each respective historical user, a sequential database indicating a set of historical actions executed by the respective historical user. In some implementations, the sequential database 124 may store retention data indicating whether particular historical users continued to use the system 100 after executing particular historical actions. In some other implementations, the retention data may be stored in a memory separate from the sequential database 124. The system 100 may use the one or more sequential databases and the retention data to train the machine learning models 150, determine an accuracy of the machine learning models 150, and/or to generate one or more recommended actions, as further described below.

The validation database 128 may store data indicating recent actions and recent action sequences executed by one or more recent users that used the system 100 during a time period associated with validating, testing, or otherwise determining an accuracy of the machine learning models 150. For example, the system 100 may monitor clickstream data representative of recent system actions executed by the recent users, and generate, based on the clickstream data, one or more validation databases indicating system actions executed by the recent users. The validation database 128 may be a part of or separate from the database 120. In some implementations, the system 100 may include one validation database indicating all recent actions executed by all recent users. In some other implementations, the system 100 may generate, for each respective recent user, a validation database indicating a set of recent actions executed by the respective recent user. In some implementations, the validation database 128 may store data indicating actual actions executed by recent users immediately after executing particular recent actions, as further described below.

The processor 130 may include one or more suitable processors capable of executing scripts or instructions of one or more software programs stored in system 100, such as within the memory 135. The processor 130 may include a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the processor 130 may include a combination of computing devices, such as a combination of a DSP and a microprocessor, a plurality of microprocessors, one or more microprocessors in conjunction with a DSP core, or any other such configuration.

The memory 135, which may be any suitable persistent memory (such as non-volatile memory or non-transitory memory) may store any number of software programs, executable instructions, machine code, algorithms, and the like that can be executed by the processor 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The pattern mining engine 140 may be used to extract action sequences from one or more databases, such as historical action sequences from the sequential database 124. In some aspects, the extracting is based at least in part on a sequential pattern mining algorithm, such as PrefixSpan, Generalized Sequential Pattern (GSP), Spade, Spam, Lapin, CM-Spam, CM-Spade, or the like. In some implementations, the pattern mining engine 140 may be used to determine, for each of a plurality of historical action sequences, a number of instances that the historical action sequence appears in the sequential database 124. In some other implementations, the pattern mining engine 140 may be used to identify action sequences being executed by one or more users in real-time. In some implementations, the pattern mining engine 140 may be used to identify an action subsequence executed by a user, such as a most recent k actions of an action sequence executed by the user, as further described below.

The machine learning models 150 may be trained using a set of training data, such as information included in the sequential database 124, and an accuracy of the machine learning models 150 may be determined using a set of test data, such as information included in the validation database 128. In some implementations, the machine learning models 150 may be any suitable classification model based on, for example, one or more decision trees, random forests, logistic regression, nearest neighbors, classification trees, control flow graphs, support vector machines, naïve Bayes, Bayesian Networks, value sets, hidden Markov models, or neural networks configured to generate predictions for the intended purpose. In some aspects, the machine learning models 150 may include a neural network of any suitable type, such as a feedforward neural network or a recurrent neural network. For example, the machine learning models 150 may include a deep neural network (DNN), which may have any suitable architecture, such as a feedforward architecture or a recurrent architecture. In some other implementations, the machine learning models 150 may be any suitable forecasting model to generate predictive values based on previous values for an input feature. Example forecasting models include one or more of an autoregressive (AR) model or a window function. Example AR models to predict values from time series data include an autoregressive integrated moving average (ARIMA) model, Facebook®'s Prophet model, or an exponential smoothing model. Example window functions may include a simplified moving average, an exponential moving average, stochastic based smoothing, or a naive forecasting model. Predictions by an example window function may be based on one or more of a mean, a minimum, or a maximum of a predefined number of values in the time series data preceding the predicted value. It is to be understood that the system 100 may use any number of suitable types of classification or regression models, and the machine learning models 150 are not limited to the provided examples or a specific type of model.

As a non-limiting example, the machine learning models 150 may be trained using labeled retention data, where each label indicates, for each of a plurality of users (such as historical users), a retention value indicating whether the user continued to use the system 100 after executing a particular action sequence. For instance, a label associated with a particular user may indicate 1 for "retained" if the user used the system 100 within a particular time period (e.g., 90 days) after executing the particular action sequence, and may indicate 0 for "churned" if the user did not use the system 100 within the particular time period after executing the particular action sequence. Once trained, the system 100 may provide the machine learning models 150 with unlabeled retention data, such as from the validation database 128, and the retention prediction engine 170 in conjunction with the machine learning models 150 may predict, for each unlabeled instance of a user (such as a recent user) executing a particular action sequence, a retention value predicting whether the user used the system 100 within a particular time period after executing the particular action sequence. Thereafter, the system 100 may determine an accuracy of (or "validate") the machine learning models 150 based on comparing the predicted values with actual (observed) retention values included in the validation database 128, where the actual values indicate whether the user was actually retained or churned after executing the particular action sequence, and recursively train, validate, and adjust the machine learning models 150 until the machine learning models 150 are capable of predicting, with an accuracy greater than a value, whether a given user will continue to use the system 100 after executing a given action sequence.

As another non-limiting example, the machine learning models 150 may be trained using labeled action sequence data, where each label indicates, for each of a plurality of action sequences, a next action value indicating which of a plurality of potential next actions that a particular user (such as a historical user) executed after executing a particular action sequence. As a non-limiting example, a next action value of "102483000" may indicate that a user executed an "Add Expense" action, as further described in connection with FIG. 11. Once trained, the system 100 may provide the machine learning models 150 with unlabeled action sequence data, such as from the validation database 128, and the action prediction engine 160 in conjunction with the machine learning models 150 may predict, for each unlabeled instance of a user (such as a recent user) executing a particular action sequence, a next action value predicting, for each potential next action, a likelihood that the user executed the potential next action after executing the particular action sequence. Thereafter, the system 100 may determine an accuracy of (or "validate") the machine learning models 150 based on comparing the predicted values with actual (observed) retention values included in the validation database 128, where the actual values indicate which of the plurality of potential next actions that the user actually executed after executing the particular action sequence, and recursively train, validate, and adjust the machine learning models 150 until the machine learning models 150 are capable of predicting, with an accuracy greater than a value, which of a plurality of potential next actions a given user is most likely to execute after executing a given action sequence.

In some implementations, once sufficiently trained, the machine learning models 150 may be capable of predicting, with an accuracy greater than a value, one or more potential actions that have the greatest likelihood of both being executed by a user after the user executes a given action sequence and retaining the user if executed by the user after the user executes the given action sequence. In some implementations, the recommendation engine 180 may generate one or more recommended actions for the user based on the one or more potential actions having the greatest likelihoods, as further described in connection with FIG. 12.

The action prediction engine 160 may be used to generate, in conjunction with the machine learning models 150, predictive values indicating whether a user will execute a particular potential action after executing a particular action sequence or subsequence. In some implementations, generating the predictive values may include determining a number of instances that the particular action subsequence appears in the sequential database 124, determining a number of instances that the particular potential action appears immediately after the particular action subsequence in the sequential database 124, and determining a probability that the user will execute the particular potential action immediately after executing the particular action subsequence based on the numbers of instances.

The retention prediction engine 170 may be used to generate, in conjunction with the machine learning models 150, predictive values indicating whether a user will continue to use the system 100 if the user executes a particular potential action after executing a particular action sequence or subsequence. In some implementations, generating the predictive values may include determining a percentage of users that continued to use the system 100 after executing the particular potential action immediately after executing the particular action subsequence, determining a percentage of the users that did not continue to use the system 100 after executing the particular potential action immediately after executing the particular action subsequence, and determining a probability that the user will continue to use the system 100 if the user executes the particular potential action immediately after executing the particular action subsequence based on the determined percentages.

The recommendation engine 180 may be used to generate, in conjunction with one or more of the machine learning models 150, the action prediction engine 160, and the retention prediction engine 170, an engineered feature, such as a confidence score indicating whether recommending a particular potential action to a user after the user executes a particular action subsequence will result in the user continuing to use the system 100. In some implementations, generating the confidence scores may be based on the predictive values generated by the action prediction engine 160 and the retention prediction engine 170, as described above. In some implementations, the recommendation engine 180 may determine one or more highest scoring actions of a plurality of potential actions based on the confidence scores, and the recommendation engine 180 may generate at least one recommended action for the user based on the one or more highest scoring actions.

The pattern mining engine 140, the machine learning models 150, the action prediction engine 160, the retention prediction engine 170, and the recommendation engine 180 may be implemented in software, hardware, or a combination thereof. In some implementations, any one or more of the pattern mining engine 140, the machine learning models 150, the action prediction engine 160, the retention prediction engine 170, or the recommendation engine 180 may be embodied in instructions that, when executed by the processor 130, cause the system 100 to perform operations associated with the machine learning models 150. The instructions of one or more of the components 140-180 may be stored in memory 135, the database 120, or another suitable memory. The instructions may be in any suitable programming language format for execution by the system 100 (such as by the processor 130). It is to be understood that the particular architecture of the system 100 shown in FIG. 1 is but one example of a variety of different architectures within which aspects of the present disclosure may be implemented. For example, in other implementations, components of the system 100 may be distributed across multiple devices, included in fewer components, and so on. While the below examples of generating action recommendations using ML are described with reference to system 100, any suitable ML-based system may be used to perform the operations described herein.

Figure 2:
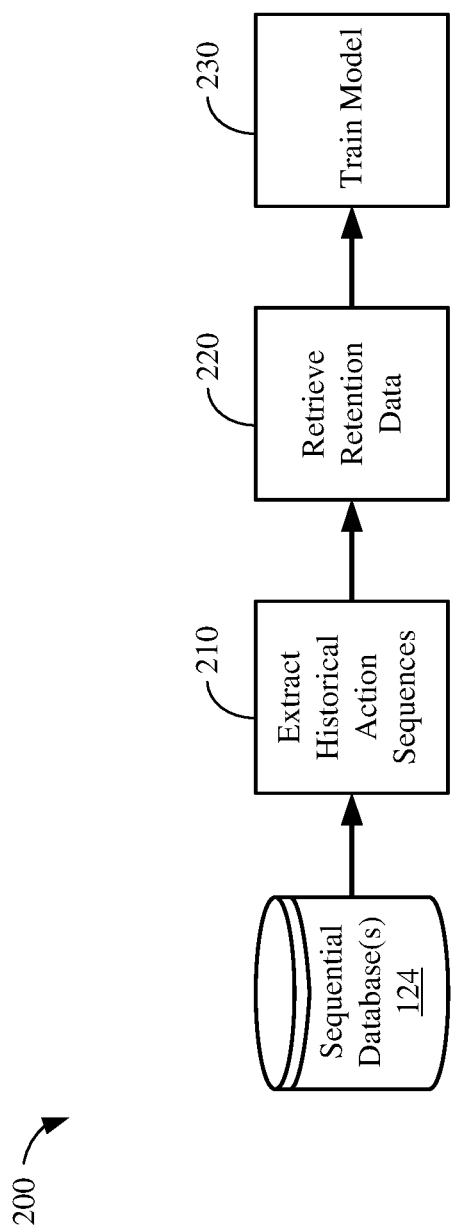
FIG. 2 shows a high-level overview of an example process flow that may be employed by the ML augmented recommendation system of FIG. 1, according to some implementations.

FIG. 2 shows a high-level overview of an example process flow 200 that may be employed by the ML augmented recommendation system 100 of FIG. 1, according to some implementations. The example process flow 200 may represent a "training period" during which the machine learning models 150 are trained to generate, for each of a plurality of potential actions, a likelihood that a user will continue to use the system 100 if the system 100 recommends the potential action to the user after the user executes a particular action subsequence.

Prior to block 210, the system 100 may monitor clickstream data representative of historical system actions executed by historical users and generate, based on the clickstream data, a sequential database (e.g., the sequential database 124) indicating the historical actions, as further described in connection with FIG. 8. In some implementations not shown, the system 100 may generate, for each respective historical user, a sequential database indicating a set of historical actions executed by the respective historical user.

At block 210, the pattern mining engine 140 may extract historical action sequences from the sequential database 124 based at least in part on a sequential pattern mining algorithm (e.g., PrefixSpan). In some implementations, the pattern mining engine 140 may determine, using the sequential pattern mining algorithm, a number of instances that each of the historical action sequences appears in the sequential database 124. In this manner, the pattern mining engine 140 may identify historical action sequences that appear in the sequential database 124 at least a minimum number of instances, which may be referred to herein as a "minimum support threshold." In other words, the pattern mining engine 140 may use sequential pattern mining to identify the most popular action sequences executed by historical users, as further described in connection with FIGS. 9-10.

At block 220, the system 100 may retrieve retention data indicating whether particular users continued to use the system 100 after executing particular action sequences. For example, the retention data may indicate, for each of a plurality of historical users, whether the respective historical user used the system 100 within a particular time period after executing a particular action sequence. In this manner, the system 100 may predict potential actions that, when executed by a user after executing a particular action sequence, are most likely to retain the user.

At block 230, the system 100 may use data included in the sequential database 124 (such as "the most popular action sequences" described above with respect to block 210) and the validation database 128 (such as the "next best actions" described above with respect to block 220) to train the machine learning models 150 to generate, for each of a plurality of potential actions, a relative likelihood that a user will continue to use the system 100 if the system 100 recommends the potential action to the user after the user executes a particular action subsequence.

Figure 3:
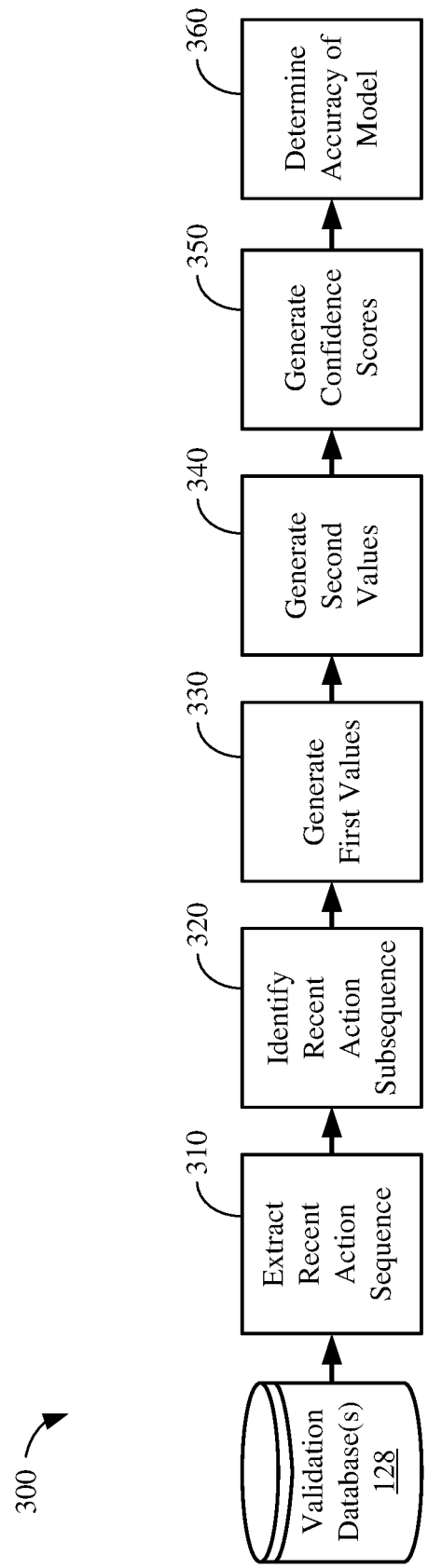
FIG. 3 shows a high-level overview of an example process flow that may be employed by the ML augmented recommendation system of FIG. 1, according to some implementations.

FIG. 3 shows a high-level overview of an example process flow 300 that may be employed by the ML augmented recommendation system 100 of FIG. 1, according to some implementations. The example process flow 300 may represent a "validation period" during which the system 100 determines an accuracy at which the trained machine learning models 150 generate, for each of a plurality of potential actions, a likelihood that a user will continue to use the system 100 if the system 100 recommends the potential action to the user after the user executes a particular action subsequence.

Prior to block 310, the system 100 may monitor clickstream data representative of recent system actions executed by recent users and generate, based on the clickstream data, a validation database (e.g., the validation database 128) indicating the recent actions. In some implementations not shown for simplicity, the system 100 may generate, for each respective recent user, a validation database indicating a set of recent actions executed by the respective recent user.

At block 310, the pattern mining engine 140 may extract, from the validation database 128, one or more recent action sequences executed by recent users. Specifically, the pattern mining engine 140 may extract a recent action sequence, $s_t$, corresponding to a chronological series of recent system actions, $<A_1, A_2, A_3, \ldots A_n>$, executed by a recent user until most recent time, t, where $A_i$ belongs to a set of executable system actions, A, which may also be referred to herein as "the plurality of potential actions," such as clicking on an "Add Expense" button, for example.

At block 320, the pattern mining engine 140 may identify, within the recent action sequence, a most recent action subsequence, $s_{k,t-1}$, executed by the recent user (such as immediately prior to time, t). In some implementations, $s_{k,t-1}$ may correspond to the k (e.g., 3) most recent actions executed by the recent user (such as until time, t−1), which may be any chronological series (including duplicates) of k actions of the plurality of potential actions, A.

At block 330, the action prediction engine 160 in conjunction with the machine learning models 150 may predict, for each potential action of the plurality of potential actions, a first value indicating a probability that the recent user will execute the potential action immediately after executing the recent action subsequence. For example, the action prediction engine 160 may determine a first number of instances, Support($s_{k,t-1}$), that the recent action subsequence, $s_{k,t-1}$, appears in the sequential database 124 and a second number of instances, Support($s_{k,t-1}A_t$), that the potential $A_t$ appears immediately after $s_{k,t-1}$ in the sequential database 124. Thereafter, the action prediction engine 160 may generate, for each potential $A_t$, a first value indicating a probability, $P(A_t|s_{k,t-1})$ (which is referred to herein as "the first value"), that the recent user will execute the potential $A_t$ immediately after executing $s_{k,t-1}$, according to the following formula:

$$P(A_t|s_{k,t-1}) = \frac{\text{Support}(s_{k,t-1}A_t)}{\text{Support}(s_{k,t-1})} \; \forall \, A_t \in A$$

At block 340, the retention prediction engine 170 in conjunction with the machine learning models 150 may predict, for each potential $A_t$, a second value indicating a probability that the recent user will continue to use the system 100 if the recent user executes the potential $A_t$ immediately after executing $s_{k,t-1}$. In some implementations, the second values may be generated based on retention data indicating a total percentage, P (Retain), of historical users that continued to use the system 100 for at least a minimum duration (e.g., 90 days), and a total percentage, P(Churn), of historical users that did not continue (or "quit") using the system 100 within the minimum duration. Thereafter, the retention prediction engine 170 may determine, for each potential $A_t$, a first percentage indicating a probability, $P(s_{k,t-1}$ (Retain), that the recent user will continue to use the system 100 if the recent user executes $A_t$ immediately after executing $s_{k,t-1}$, according to the following formula:

$$P(s_{k,t-1}A_t|\text{Retain}) = \frac{\text{RetainSupport}(s_{k,t-1}A_t)}{\text{RetainSupport}(s_{k,t-1})} \; \forall \, A_t \in A$$

where RetainSupport($s_{k,t-1}A_t$) represents a number of the P(Retain) users that executed $A_t$ immediately after executing $s_{k,t-1}$, and where RetainSupport($s_{k,t-1}$) represents a total number of the P(Retain) users that executed $s_{k,t-1}$.

Continuing the above example, the retention prediction engine 170 may also determine, for each potential $A_t$, a second percentage indicating a probability, $P(s_{k,t-1}|(\text{Churn})$, that the recent user will not continue to use the system 100 if the recent user executes $A_t$ immediately after executing $s_{k,t-1}$, according to the following formula:

$$P(s_{k,t-1}A_t|\text{Churn}) = \frac{\text{ChurnSupport}(s_{k,t-1}A_t)}{\text{ChurnSupport}(s_{k,t-1})} \; \forall \, A_t \in A$$

where ChurnSupport($s_{k,t-1}A_t$) represents a number of the P(Churn) users that executed $A_t$ immediately after executing $s_{k,t-1}$, and ChurnSupport($s_{k,t-1}$) represents a total number of the P(Churn) users that executed $s_{k,t-1}$.

Continuing the above example, the retention prediction engine 170 may thus generate, for each potential $A_t$, a probability, $P(\text{Retain}|s_{k,t-1}A_t)$ (which is referred to herein as "the second value"), that the recent user will continue to use the system 100 if the recent user executes $A_t$ immediately after executing $s_{k,t-1}$. In some aspects, the second value may be generated based on a probabilistic model, such as Bayes' theorem or another suitable model for determining conditional probabilities. In some implementations, the retention prediction engine 170 may generate P (Retain'$s_{k,t-1}|A_t$) for a given $A_t$ according to the following formula:

$$P(\text{Retain}|s_{k,t-1}A_t) = \frac{P(s_{k,t-1}|\text{Retain}) * P(\text{Retain})}{P(s_{k,t-1}|\text{Retain}) * P(\text{Retain}) + P(s_{k,t-1}|\text{Churn}) * P(\text{Churn})} \; \forall \, A_t \in A$$

At block 350, the system 100 may predict, for each potential $A_t$, a confidence score indicating a likelihood that recommending the potential $A_t$ after the recent user executes $s_{k,t-1}$ will result in the recent user continuing to use the system 100. In some implementations, the system 100 may generate the confidence score based on a product of the first value described with respect to block 330 and the second value described with respect to block 340. In some implementations, the system 100 may generate the confidence score according to the following formula:

$$\text{ConfidenceScore}_{A_t} = P(A_t|s_{k,t-1}) * P(\text{Retain}|s_{k,t-1}A_t)$$

At block 360, the system 100 may determine an accuracy of the machine learning models 150 based in part on the predicted values and actual values included in one or more databases, such as the validation database 128 described in connection with FIG. 1. Specifically, the system 100 may determine an accuracy at which the machine learning models 150 can predict whether a given user will continue to use the system 100 after executing a given action sequence and determine an accuracy at which the machine learning models 150 can predict which of a plurality of potential next actions a given user is most likely to execute after executing a given action sequence, and recursively adjust the machine learning models 150 until the machine learning models 150 are capable of predicting which of a plurality of potential actions has the greatest likelihood of retaining a given user if the potential action is the next action the user executes after executing a given action sequence.

Figure 4:
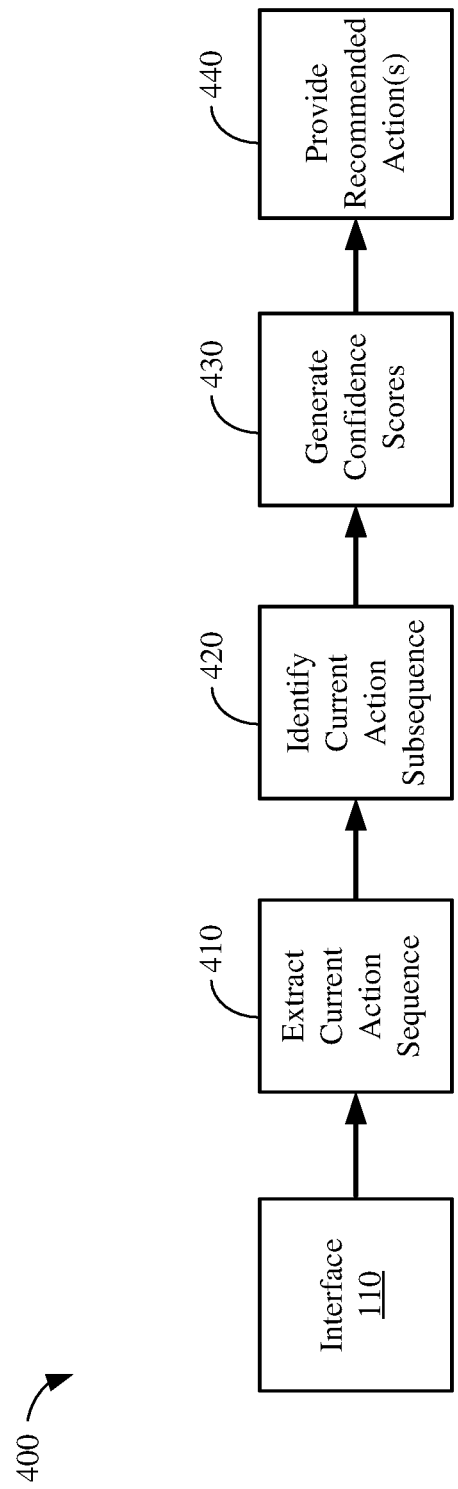
FIG. 4 shows a high-level overview of an example process flow that may be employed by the ML augmented recommendation system of FIG. 1, according to some implementations.

FIG. 4 shows a high-level overview of an example process flow 400 that may be employed by the ML augmented recommendation system 100 of FIG. 1, according to some implementations. The example process flow 400 may represent a "real-time recommendation period" during which the system 100 (e.g., the recommendation engine 180 in conjunction with the machine learning models 150) generates at least one recommended action for a user while the user is using the system 100 in real-time.

At block 410, the system 100 may monitor clickstream data representative of current system actions being executed by a current user, such as via the interface 110, in real-time, and the pattern mining engine 140 may extract a current action sequence, s, corresponding to a chronological series of current system actions, $<A_1, A_2, A_3, \ldots A_n>$, executed by the current user, where $A_i$ belongs to a set of system actions, A, executable by the current user.

At block 420, the pattern mining engine 140 may identify, within the current action sequence a current action subsequence, $s_k = \langle A_{n-2}, A_{n-1}, A_n \rangle$, where $A_{n-2}$, $A_{n-1}$, and $A_n$ correspond to the k (e.g., 3) most recent actions executed, in order, by the current user.

At block 430, the system 100 in conjunction with the machine learning models 150 may generate, in real-time, a confidence score for each potential $A_t$ based on a first value generated for the potential $A_t$ (such as by the action prediction engine 160) and a second value generated for the potential $A_t$ (such as by the retention prediction engine 170). For the example of FIG. 4, the first value may indicate a probability that the current user will execute the potential $A_t$ immediately after executing $s_k$, the second value may indicate a probability that the current user will continue to use the system 100 if the current user executes the potential $A_t$ immediately after executing $s_k$, and the confidence score may indicate a likelihood that recommending the potential $A_t$ after the current user executes s k will result in the current user continuing to use the system 100, where the confidence score is generated based on a product of the first value and the second value.

At block 440, the recommendation engine 180 may generate, in real-time, one or more recommended actions corresponding to the potential actions having the highest confidence scores—where $\max_{A_t}(P(A_t|s_k) * P(\text{Retain}|s_k A_t))$ corresponds to the potential action having the highest (or maximum) confidence score. In some implementations, the recommendation engine 180 may determine the n (e.g., 3) potential actions having the n highest confidence scores, such as "Add Invoice," "Add Expense," and "Add Deposit," for example. Thereafter, the recommendation engine 180 may provide the at least one recommended action to the current user. For example, the recommendation engine 180 may display (such as via the interface 110) a recommendation window including a clickable button for each recommended action, e.g., an "Add Invoice" button, an "Add Expense" button, and an "Add Deposit" button. In some implementations, in response to receiving an indication of a selected action from the current user (such as via the interface 110), the system 100 may provide the current user with—or otherwise redirect the user to—an interface associated with the selected action, such as an interface for adding an invoice, adding an expense, or adding a deposit. For example, in response to the current user clicking on the "Add Invoice" button (such as while the current user is viewing an interface for adding deposits), the system 100 may redirect the current user to an interface for adding invoices.

Figure 5:
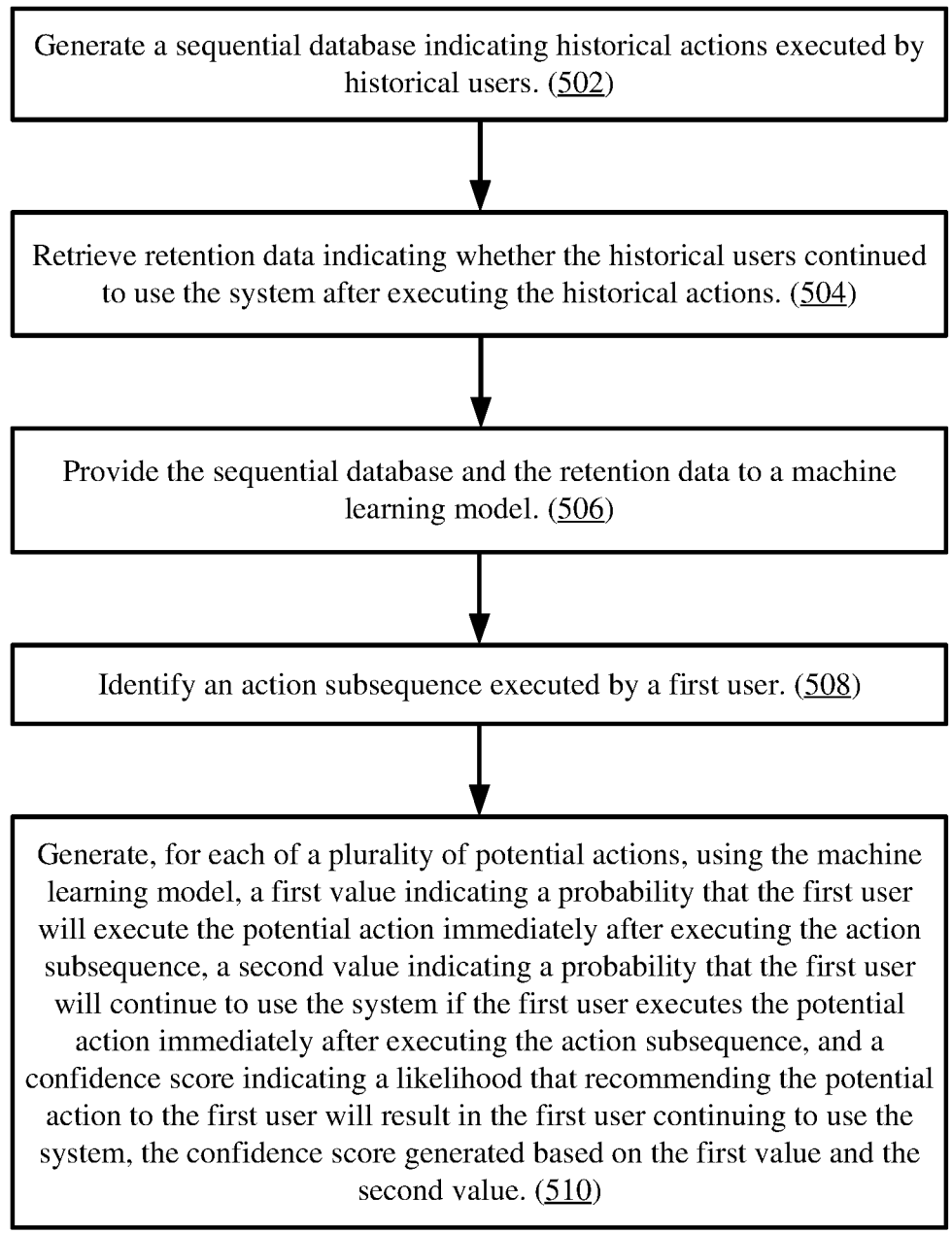
FIG. 5 shows an illustrative flow chart depicting an example operation for scoring potential actions, according to some implementations.

FIG. 5 shows an illustrative flow chart depicting an example operation 500 for scoring potential actions, according to some implementations. The example operation 500 may be performed by one or more processors of a computing device associated with the recommendation system. In some implementations, the example operation 500 may be performed using the ML augmented recommendation system 100 of FIG. 1. It is to be understood that the example operation 500 may be performed by any suitable systems, computers, or servers.

At block 502, the system 100 generates a sequential database indicating historical actions executed by historical users. At block 504, the system 100 retrieves retention data indicating whether the historical users continued to use the system after executing the historical actions. At block 506, the system 100 provides the sequential database and the retention data to a machine learning model. At block 508, the system 100 identifies an action subsequence executed by a first user. At block 510, the system 100 generates, for each of a plurality of potential actions, using the machine learning model, a first value indicating a probability that the first user will execute the potential action immediately after executing the action subsequence, a second value indicating a probability that the first user will continue to use the system if the first user executes the potential action immediately after executing the action subsequence, and a confidence score indicating a likelihood that recommending the potential action to the first user will result in the first user continuing to use the system, the confidence score generated based on the first value and the second value.

Figure 6:
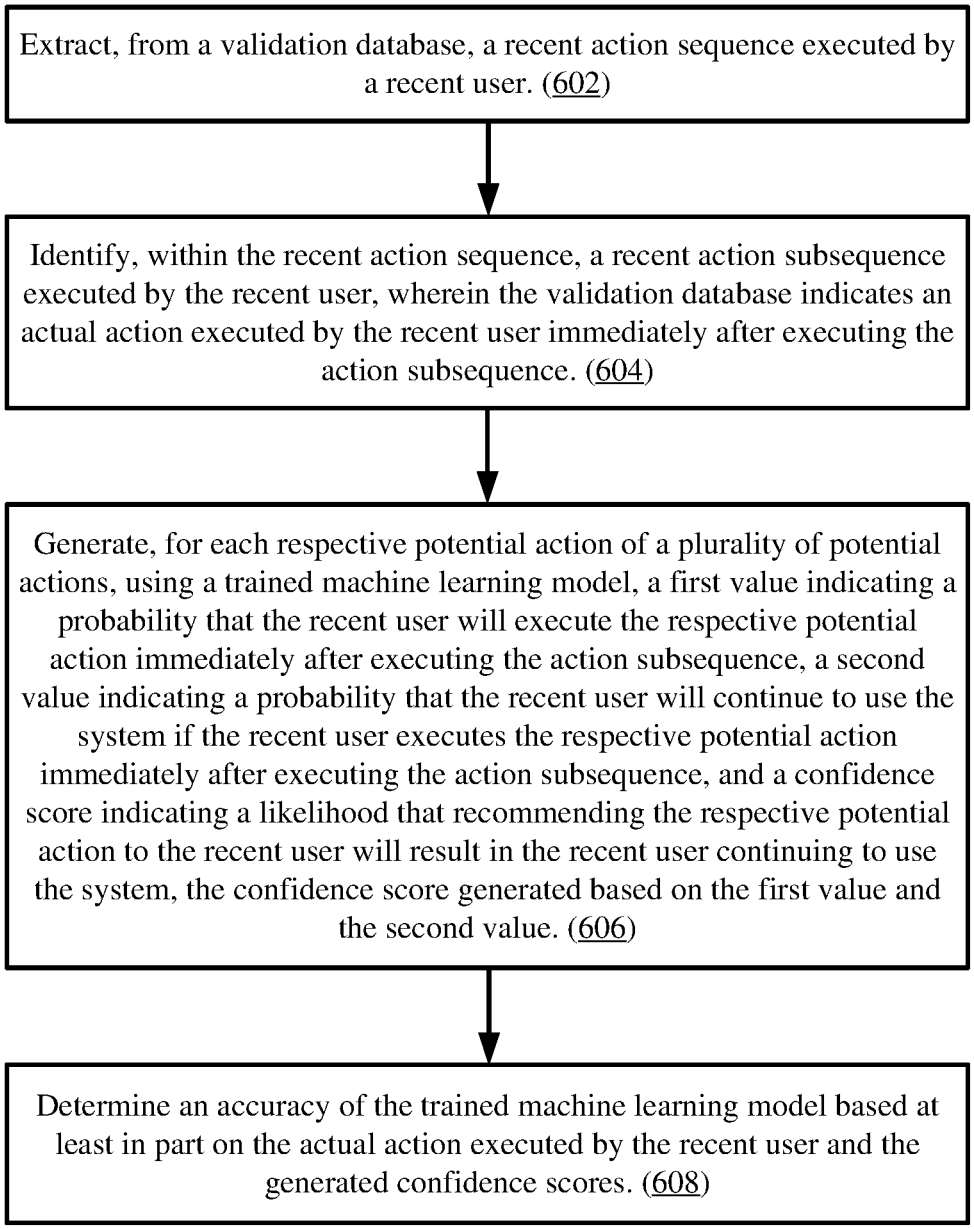
FIG. 6 shows an illustrative flow chart depicting an example operation for scoring potential actions, according to some implementations.

FIG. 6 shows an illustrative flow chart depicting an example operation 600 for scoring potential actions, according to some implementations. The example operation 600 may be performed by one or more processors of a computing device associated with the recommendation system. In some implementations, the example operation 600 may be performed using the ML augmented recommendation system 100 of FIG. 1. It is to be understood that the example operation 600 may be performed by any suitable systems, computers, or servers.

At block 602, the system 100 extracts, from a validation database, a recent action sequence executed by a recent user. At block 604, the system 100 identifies, within the recent action sequence, a recent action subsequence executed by the recent user, wherein the validation database indicates an actual action executed by the recent user immediately after executing the action subsequence. At block 606, the system 100 generates, for each respective potential action of a plurality of potential actions, using a trained machine learning model, a first value indicating a probability that the recent user will execute the respective potential action immediately after executing the action subsequence, a second value indicating a probability that the recent user will continue to use the system if the recent user executes the respective potential action immediately after executing the action subsequence, and a confidence score indicating a likelihood that recommending the respective potential action to the recent user will result in the recent user continuing to use the system, the confidence score generated based on the first value and the second value. At block 608, the system 100 determines an accuracy of the trained machine learning model based at least in part on the actual action executed by the recent user and the generated confidence scores.

Figure 7:
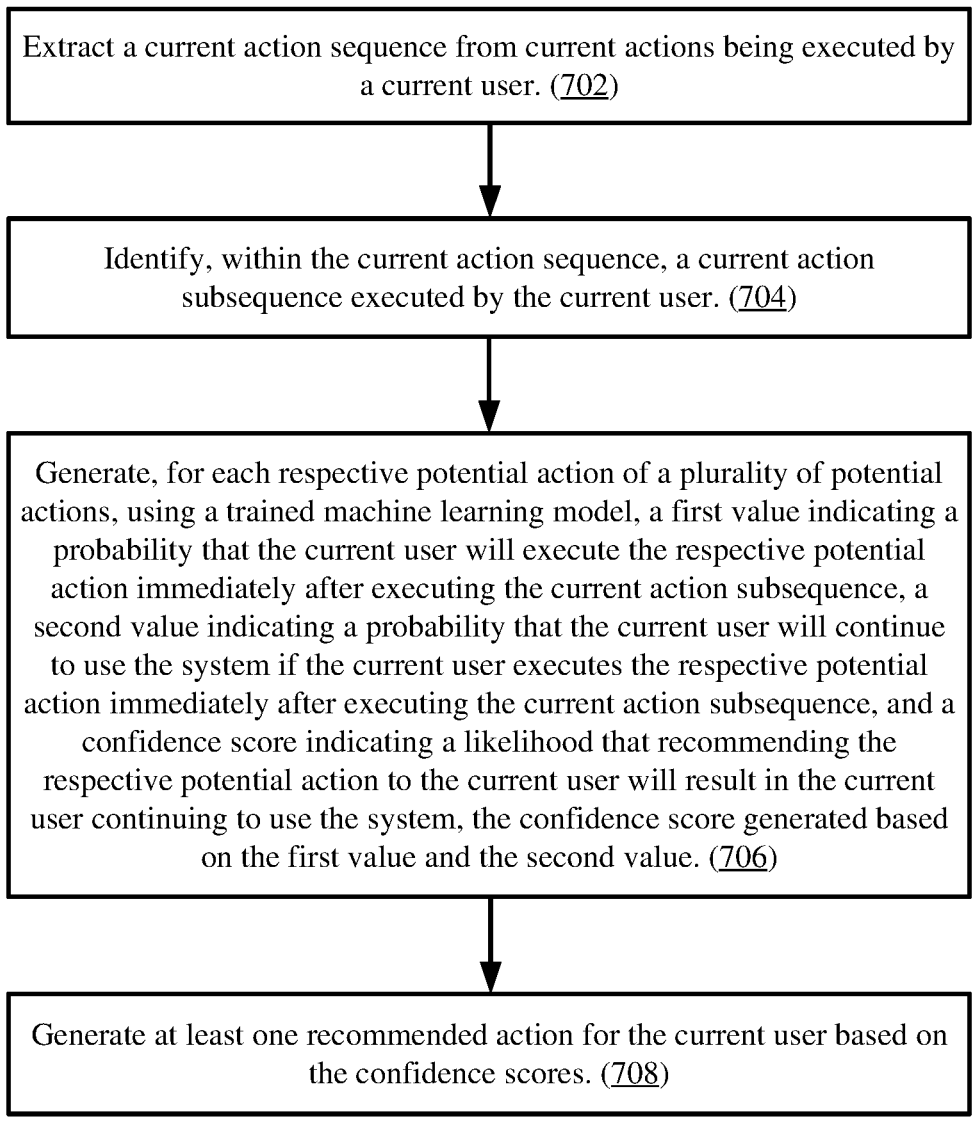
FIG. 7 shows an illustrative flow chart depicting an example operation for scoring potential actions, according to some implementations.

FIG. 7 shows an illustrative flow chart depicting an example operation 700 for scoring potential actions, according to some implementations. The example operation 700 may be performed by one or more processors of a computing device associated with the recommendation system. In some implementations, the example operation 700 may be performed using the ML augmented recommendation system 100 of FIG. 1. It is to be understood that the example operation 700 may be performed by any suitable systems, computers, or servers.

At block 702, the system 100 extracts a current action sequence from current actions being executed by a current user. At block 704, the system 100 identifies, within the current action sequence, a current action subsequence executed by the current user. At block 706, the system 100 generates, for each respective potential action of a plurality of potential actions, using a trained machine learning model, a first value indicating a probability that the current user will execute the respective potential action immediately after executing the current action subsequence, a second value indicating a probability that the current user will continue to use the system if the current user executes the respective potential action immediately after executing the current action subsequence, and a confidence score indicating a likelihood that recommending the respective potential action to the current user will result in the current user continuing to use the system, the confidence score generated based on the first value and the second value. At block 708, the system 100 generates at least one recommended action for the current user based on the confidence scores.

FIG. 8 shows an example depiction of user actions data 800, according to some implementations. Each row of the user actions data 800 includes data points corresponding to a particular system action executed by a particular user. In some implementations, the system 100 may monitor clickstream data representative of system actions executed by users and store data points for each system action in a separate row of the user actions data 800. In some implementations, the user actions data 800 may initially be stored out of order with reference to time, and the system 100 may sort the system actions in chronological order of execution based on Action Time 806. In some implementations, the user actions data 800 may be a sequential database (such as the sequential database 124) indicating historical system actions executed by one or more historical users, and the system 100 may extract one or more historical action sequences from the user actions data 800, as further described in connection with FIG. 9 and FIG. 10. In some other implementations, the user actions data 800 may be a validation database (such as the validation database 128) indicating recent system actions executed by one or more recent users, and the system 100 may extract one or more recent action sequences from the user actions data 800, as further described in connection with FIG. 9 and FIG. 11. In some other implementations, the user actions data 800 may indicate current system actions being executed by a current user, and the system 100 may generate, in real-time, one or more recommended actions for the current user based at least in part on the current system actions, as further described in connection with FIG. 9 and FIG. 12.

User ID 802 indicates, for each respective row of the user actions data 800, a unique user identifier (ID) assigned to the user that executed the system action listed in the respective row. For the example of FIG. 8, the user ID assigned to the user that executed the system actions listed in rows 812-818 is 53798557. Although the user actions data 800 shows four system actions executed by a same user, it is to be understood that the user actions data 800 may include any number of system actions executed by any number of users.

Action ID 804 indicates, for each respective row of the user actions data 800, a unique action ID assigned to the system action listed in the respective row. For the example of FIG. 8, the action ID assigned to the system actions listed in rows 812-818 are 102483000, 102483006, 102483006, and 102483022, respectively, where the system action listed in row 814 and row 816 is the same system action executed two separate times. Although the user actions data 800 shows three unique system actions, it is to be understood that the user actions data 800 may include any number of unique system actions.

Action Time 806 indicates, for each respective row of the user actions data 800, a date and time that the user executed the system action listed in the respective row. For the example of FIG. 8, the system actions listed in rows 812-818 were executed on 2019-08-09 at 07:21:21, 2019-08-09 at 07:58:02, 2019-08-09 at 08:11:22, and 2019-08-09 at 09:03:50, respectively.

Start Date 808 indicates, for each respective row of the user actions data 800, the date that the user listed in the respective row started using the system 100. For the example of FIG. 8, the user that executed the system actions listed in rows 812-818 started using the system 100 on 2019 Aug. 8, thus each of rows 812-818 indicates a same date. In various implementations, a user may "start using the system" on the day that the user signs up to use the system 100, generates a profile associated with the system 100, is assigned a User ID, and/or executes a system action for the first time.

Action Name 810 indicates, for each respective row of the user actions data 800, a plain text representation for the system action listed in the respective row. For the example of FIG. 8, the plain text representations for the system actions listed in rows 812-818 are "Add Expense," "Add Bill," "Add Bill," and "Add Vendor," respectively.

FIG. 9 shows an example depiction of user action sequences data 900, according to some implementations. Each row of the user action sequences data 900 includes data points corresponding to a chronological series of system actions (or "action sequence") executed by a particular user. In some implementations, the action sequences may be extracted from one or more databases based at least in part on a sequential pattern mining algorithm.

In some implementations, each respective action sequence listed in the user action sequences data 900 may correspond to a series of historical system actions (a "historical action sequence") executed by a historical user, and the pattern mining engine 140 in conjunction with the machine learning models 150 may extract the historical action sequence from a sequential database (such as the sequential database 124) associated with the historical user, as described in connection with FIG. 2. In some other implementations, each respective action sequence listed in the user action sequences data 900 may correspond to a series of recent system actions (a "recent action sequence") executed by a recent user, and the pattern mining engine 140 in conjunction with the machine learning models 150 may extract the recent action sequence from a validation database (such as the validation database 128) associated with the recent user, as described in connection with FIG. 3. In some other implementations, each respective action sequence listed in the user action sequences data 900 may correspond to a series of current system actions (a "current action sequence") being executed by a current user in real-time, and the pattern mining engine 140 in conjunction with the machine learning models 150 may extract the current action sequence from the chronological series of current system actions being executed by the current user, as described in connection with FIG. 4.

User ID 902 indicates, for each respective row of the user action sequences data 900, the user ID assigned to the user that executed the action sequence listed in the respective row, as described in connection with FIG. 8. For the example of FIG. 9, the user ID assigned to the user that executed the action sequence listed in rows 906-912 is 108926873, 154275242, 151147017, and 157223518, respectively. Although the user action sequences data 900 shows four action sequences executed by four different users, it is to be understood that the user action sequences data 900 may include any number of action sequences executed by any number of users.

Action Sequence 904 indicates, for each respective row of the user action sequences data 900, the chronological series of system actions corresponding to the action sequence listed in the respective row, where each system action included within the action sequence is separated by a vertical line and is represented by the unique action ID assigned to the given system action. For the example of FIG.

9, the action IDs associated with the chronological series of system actions corresponding to the action sequence listed in row 906 include, in order of execution, 102483040, 102483040, 102483040, 102483040, 102483002, 102483002, 102483021, and 102483002, and so on. It is to be understood that the system actions included within a given action sequence listed in the user action sequences data 900 may include any number of duplicate system actions, may all be the same system action, or may all be different system actions. Although the user action sequences data 900 shows four different action sequences each including eight system actions, the user action sequences data 900 may list any number of action sequences each including a same or different number of system actions, such as some action sequences including only one system action, some action sequences including twenty action sequences, and so on.

FIG. 10 shows an example depiction of action sequence count data 1000, according to some implementations. Each row of the action sequence count data 1000 includes data points corresponding to a respective action sequence executed by one or more users and a number of instances that the respective action sequence appears in one or more databases, such as the sequential database 124. In some implementations, the pattern mining engine 140 in conjunction with the machine learning models 150 may extract each of the action sequences from one or more databases (such as the sequential database 124) based at least in part on the sequential pattern mining algorithm and store each of the identified action sequences in a separate row of the action sequence count data 1000. Although the action sequence count data 1000 shows four different action sequences each including four system actions, the action sequence count data 1000 may list any number of action sequences each including a same or different number of system actions.

Action Sequence 1002 indicates, for each respective row of the action sequence count data 1000, the chronological series of system actions corresponding to the action sequence listed in the respective row, where each system action included within the action sequence is represented by the unique action ID assigned to the given system action. For the example of FIG. 10, the action IDs associated with the chronological series of system actions corresponding to the action sequence listed in row 1006 include, in order of execution, 102483006, 102483009, 102483001, and 102483000, and so on.

Instances 1004 indicates, for each respective action sequence listed in the action sequence count data 1000, a total number of instances that the respective action sequence appears in one or more databases, such as the one or more sequential databases 124. The number of instances may also be referred to herein as a "support" or a "count" for the respective action sequence. In some implementations, the action sequence count data 1000 may initially be stored out of order with reference to the number of instances, and the system 100 may sort the action sequences in order of support based on Instances 1004. In some implementations, the pattern mining engine 140 may selectively store action sequences having at least a minimum number of instances (a "minimum support threshold"), and the action sequence count data 1000 may selectively list the most popular (e.g., by number of instances) action sequences. In some aspects, the minimum support threshold may be a percentage (e.g., 20%) of a total number of action sequences that appear in the one or more databases. In some implementations, the pattern mining engine 140 may use the sequential pattern mining algorithm to identify one or more prefix subsequences included within the one or more databases, identify postfix subsequences corresponding to subsets of the prefix subsequences, filter the one or more databases for the postfix subsequences, and recursively mine the filtered databases for the most frequently appearing subsequences by number of instances. In this manner, the pattern mining engine 140 may significantly reduce the number of action sequences included in the one or more databases such that the system 100 may more efficiently process the action sequences, such as when determining a number of instances a given action sequence appears in the one or more databases, when determining a number of instances that a potential action appears immediately after a given action sequence in the one or more databases, and so on.

In some implementations not shown, the pattern mining engine 140 may determine, for each respective action sequence listed in the action sequence count data 1000, a number of system actions included in the respective action sequence. In some aspects, the pattern mining engine 140 may filter action sequences from the action sequence count data 1000 that include a number of system actions above or below a particular value (e.g., 6). Although the number of system actions included in each of the action sequences listed in the action sequence count data 1000 is 4, the action sequences may include any number of system actions.

In some other implementations not shown, the pattern mining engine 140 may determine, for each respective action sequence listed in the action sequence count data 1000, a number of unique system actions included in the respective action sequence. In some aspects, the pattern mining engine 140 may filter action sequences from the action sequence count data 1000 that include a number of unique system actions above or below a same or different particular value (e.g., 3). Although the number of unique system actions included in each of the action sequences listed in the action sequence count data 1000 is 4 (that is, none of the action sequences include duplicate system actions), the action sequences may include any number of duplicate system actions.

FIG. 11 shows an example depiction of model output data 1100, according to some implementations. For example, the machine learning models 150 may receive, as input from the validation database 128, one or more action subsequences executed by a particular user. Thereafter, the action prediction engine 160, the retention prediction engine 170, and the recommendation engine 180, in conjunction with the machine learning models 150, may generate predictive values for the input, and the machine learning models 150 may output the model output data 1100, where each respective row of the model output data 1100 indicates the predictive value for the action subsequence and the user associated with the respective row.

User ID 1102 indicates, for each respective row of the model output data 1100, a user ID assigned to the user that executed the system action listed under Actual Action 1110 for the respective row. For the example of FIG. 11, the user ID assigned to the user that executed the system action listed in row 1116 is 129493939, the user ID assigned to the user that executed each of the system actions listed in rows 1118-1124 is 131708454, the user ID assigned to the user that executed the system action listed in row 1126 is 85213578, and the user ID assigned to the user that executed each of the system actions listed in rows 1128-1130 is 85661281. It is to be understood that the model output data 1100 may indicate any number of system actions in any number of rows for any number of users.

Predicted Action 1104 indicates, for each respective row of the model output data 1100, an action ID assigned to the predicted next action listed in the respective row. For the example of FIG. 11, the action IDs assigned to the predicted next actions listed in rows 1116-1130 are 102483000, 102483003, 102483000, 102483001, 102483022, 102483000, 102483000, and 102483001, respectively, where each of the predicted next actions for a given user are different (such as in rows 1118-1124), and where a same next action may be predicted for multiple users (such as in rows 1116, 1120, 1126, and 1128). Although the model output data 1100 shows eight predicted next actions for a total of four different users, the model output data 1100 may include any number of predicted next actions for any number of users.

First Value 1106 indicates, for each respective row of the model output data 1100, a first value indicating a probability that the next action executed by the user listed in the row will be the predicted next action listed in the row.

Second Value 1108 indicates, for each respective row of the model output data 1100, a second value indicating a probability that the user listed in the row will continue to use the system 100 if the next action executed by the user is the predicted next action listed in the row.

Actual Action 1110 indicates, for each respective row of the model output data 1100, an action ID assigned to an actual action that the user executed after executing the action subsequence listed in the row, which is not shown for simplicity. For the example of FIG. 11, the action ID assigned to the actual action executed by the user listed in row 1116 is 102483000, which is the same as the predicted next action for the user. As another example, the action ID assigned to the actual action executed by the user listed in rows 1128-1130 is 102483001, which is the same as one of the predicted next actions for the user. The system 100 may determine an accuracy of the machine learning models 150 based on comparing the actual actions with the predicted next actions, as described above in connection with FIG. 1 and FIG. 3.

Confidence Score 1112 indicates, for each respective row of the model output data 1100, a confidence score generated based on a product of the first value and the second value. For the example of FIG. 11, the confidence score (0.010744) for row 1128 is an approximate product of the "first value" (0.791688384) for row 1128 and the "second value" (0.013570631) for row 1128. As described above, the confidence score indicates a likelihood that recommending the predicted next action will result in the user listed in the row continuing to use the system 100.

Action Name 1114 indicates, for each respective row of the model output data 1100, a plain text representation of the predicted next action listed in the respective row. For the example of FIG. 11, the plain text representation of the predicted next actions listed in rows 1116-1130 are "Add Expense," "Add Check," "Add Expense," "Add Deposit," "Add Vendor," "Add Expense," "Add Expense," and "Add Deposit," respectively.

Figure 12:
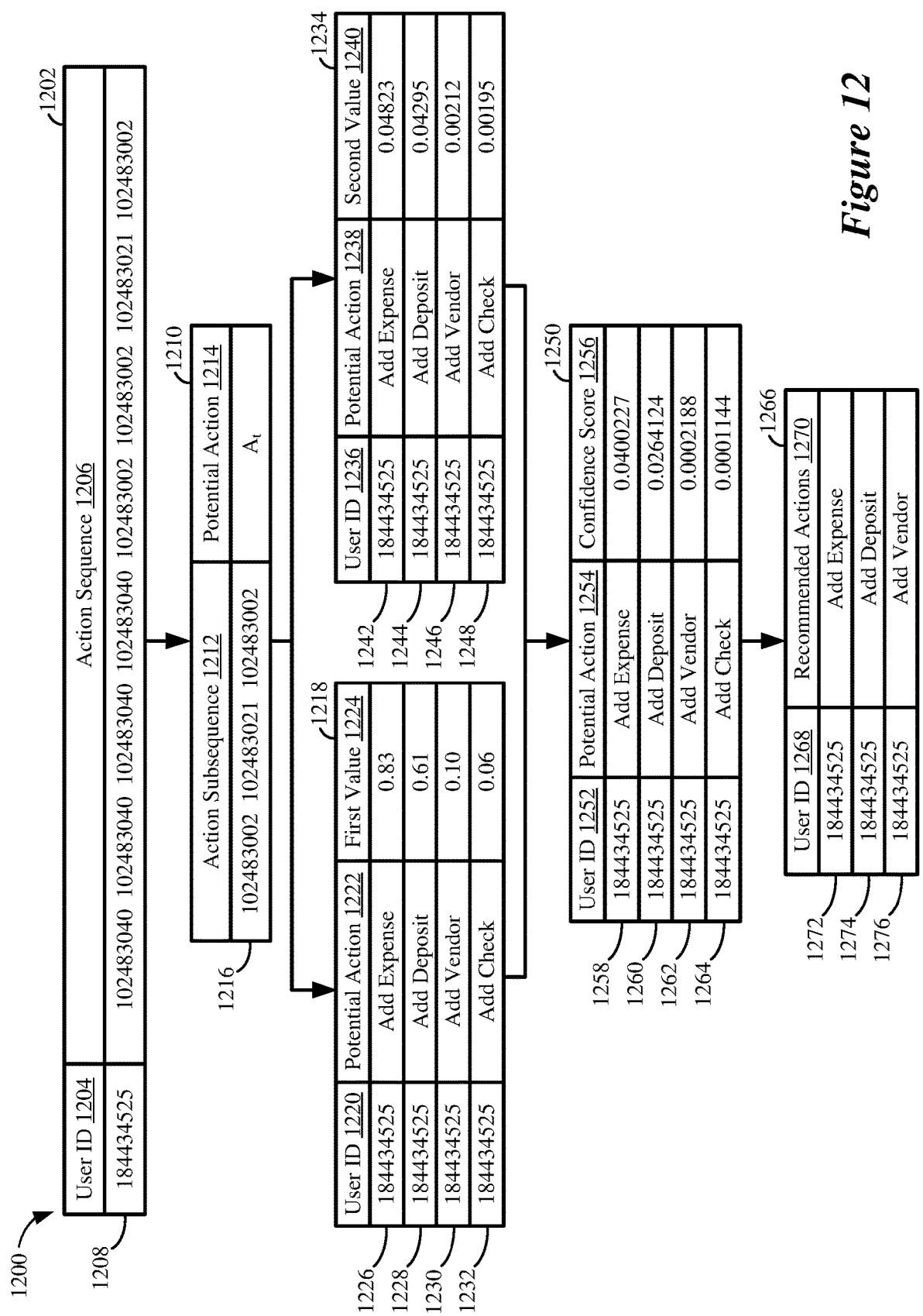
FIG. 12 shows an illustrative sequence diagram depicting an example workflow for generating one or more recommended actions, according to some implementations.

FIG. 12 shows an illustrative sequence diagram depicting an example workflow 1200 for generating one or more recommended actions, according to some implementations. The example workflow 1200 may represent a "real-time recommendation period" during which the system 100 (e.g., the recommendation engine 180 in conjunction with the machine learning models 150) generates at least one recommended action for a user while the user is using the system 100 in real-time.

Each row of sequence data 1202 includes data points corresponding to an action sequence executed by a user (such as a current user) executing system actions in real-time. For example, the system 100 may monitor clickstream data representative of system actions executed by the user, identify the action sequence based on the system actions, and store the action sequence in a row of the sequence data 1202. User ID 1204 indicates, for each respective row of the sequence data 1202, a user ID assigned to the user that executed the action sequence listed in the respective row. For the example of FIG. 12, the user ID assigned to the user that executed the action sequence listed in row 1208 is 184434525. Action Sequence 1206 indicates, for each respective row of the sequence data 1202, the chronological series of system actions corresponding to the action sequence listed in the respective row, where each system action included within the action sequence is represented by the unique action ID assigned to the given system action. For the example of FIG. 12, the action IDs corresponding to the action sequence listed in row 1208 include, in order of execution, 102483040, 102483040, 102483040, 102483040, 102483002, 102483002, 102483021, and 102483002.

Each row of subsequence data 1210 includes data points corresponding to an action subsequence identified within a corresponding action sequence listed in the sequence data 1202. Action Subsequence 1212 indicates, for each respective row of the subsequence data 1210, the chronological series of system actions corresponding to the action subsequence listed in the respective row, which may correspond to a k (e.g., 3) most recent actions executed by the user in some implementations. For the example of FIG. 12, k=3, and the action IDs corresponding to the action subsequence listed in row 1216 include, in order of execution, 102483002, 102483021, and 102483002, which correspond to the three most recent actions in row 1208 of sequence data 1202. Potential Action 1214 indicates, for each respective row of the subsequence data 1210, a potential action, $A_i$, of a plurality of potential actions that the user could execute after executing the action subsequence listed in the respective row. It is to be understood that the subsequence data 1210 may include one row for each of the plurality of potential actions, which is not shown for simplicity.

Each row of first value data 1218 includes data points corresponding to a first value indicating a probability that the next action executed by the user listed in the row will be the potential action listed in the row, where User ID 1220 indicates the user ID assigned to the user listed in the row and Potential Action 1222 indicates a plain text representation of the potential action listed in the row. First Value 1224 indicates, for each respective row of the first value data 1218, the first value (such as between 0-1) generated for the potential action listed in the row. For the example of FIG. 12, the first values generated for the potential actions listed in rows 1226-1232 are 0.83, 0.61, 0.10, and 0.06, respectively.

Each row of second value data 1234 includes data points corresponding to a second value indicating a probability that the user listed in the row will continue to use the system 100 if the next action executed by the user is the potential action listed in the row, where User ID 1236 indicates the user ID assigned to the user listed in the row and Potential Action 1238 indicates a plain text representation of the potential action listed in the row. Second Value 1240 indicates, for each respective row of the second value data 1234, the second value (such as between 0-1) generated for the potential action listed in the row. For the example of FIG. 12, the second values generated for the potential actions listed in rows 1242-1248 are 0.04823, 0.00212, and 0.00195, respectively.

Each row of confidence score data 1250 includes data points corresponding to a confidence score indicating a likelihood that the user listed in the row will continue to use the system 100 if the next action executed by the user is the potential action listed in the row, where User ID 1252 indicates the user ID assigned to the user listed in the row and Potential Action 1254 indicates a plain text representation of the potential action listed in the row. Confidence Score 1256 indicates, for each respective row of the confidence score data 1250, the confidence score (such as between 0-1) generated for the potential action listed in the row. For the example of FIG. 12, the confidence score generated for the potential actions listed in rows 1258-1264 are 0.0400227, 0.0264124, 0.0002188, and 0.0001144, respectively.

Each row of recommendation data 1266 includes data points corresponding to a plain text representation of a recommended action listed in the respective row. In some implementations, the recommended actions may correspond to a n (e.g., 3) number of the potential actions having the highest confidence scores, such as based on the confidence score data 1250. User ID 1268 indicates the user ID assigned to the user listed in the row and Recommended Actions 1270 indicates a plain text representation of the recommended action listed in the row. For the example of FIG. 12, the plain text representation of the recommended actions listed in rows 1272-1276 are "Add Expense," "Add Deposit," and "Add Vendor," respectively, which correspond to the three highest scoring potential actions listed in the confidence score data 1250. In some implementations not shown for simplicity, the system 100 may provide the at least one recommended action to the user, such as by displaying a recommendation window to the user including a different clickable button for each of the at least one recommended actions.

Although FIGS. 8-12 show a number of example rows and columns for the data depicted in the respective Figure, it is to be understood that the data may not include one or more of the example rows and columns and/or may include any number of additional rows or columns. Furthermore, the data may be in any suitable format for processing by the system 100. For example, the data may be included in one or more JavaScript Object Notation (JSON) files or objects or may be in Structured Query Language (SQL) compliant data sets for filtering and sorting by the system 100, such as by the processor 130.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. For example, while the figures and description depict an order of operations in performing aspects of the present disclosure, one or more operations may be performed in any order or concurrently to perform the described aspects of the disclosure. In addition, or to the alternative, a depicted operation may be split into multiple operations, or multiple operations that are depicted may be combined into a single operation. Thus, the claims are not intended to be limited to the implementations shown herein but are to be accorded the widest scope consistent with this disclosure, the principles and the novel features disclosed herein.

What is claimed is:

1. A method for scoring potential actions, the method performed by one or more processors of a system and comprising:
    generating a sequential database indicating historical actions executed by historical users;
    retrieving retention data indicating whether the historical users continued to use the system after executing the historical actions;
    providing the sequential database and the retention data to a machine learning model;
    identifying an action subsequence executed by a first user;
    generating a validation database indicating recent action sequences executed by recent users, the identified action subsequence included within the recent action sequences, and the validation database indicating actual actions executed by previous users immediately after executing the action subsequence;
    generating, for each of a plurality of potential actions, using the machine learning model, a first value indicating a probability that the first user will execute the potential action immediately after executing the action subsequence based on the actual actions executed by previous users;
    generating, for each respective potential action of the plurality of potential actions, using the machine learning model, a second value indicating a probability that the first user will continue to use the system if the first user executes the potential action immediately after executing the action subsequence based at least in part on the retention data; and
    generating, for each respective potential action of the plurality of potential actions, using the machine learning model, a confidence score indicating a likelihood that recommending the potential action to the first user will result in the first user continuing to use the system, the confidence score generated based on the first value and the second value.

2. The method of claim 1, further comprising:
    extracting historical action sequences from the sequential database, wherein the identified action subsequence is included within the historical action sequences; and
    determining, for each of the historical action sequences, a number of instances that the historical action sequence appears in the sequential database, wherein generating the first value and the second value is based at least in part on the numbers of instances.

3. The method of claim 1, the method further comprising:
    providing the validation database to the machine learning model; and
    determining an accuracy of the machine learning model based at least in part on the validation database.

4. The method of claim 1, wherein generating the first value includes:
    determining a first number of instances that the action subsequence appears in the sequential database;
    determining a second number of instances that the potential action appears immediately after the action subsequence in the sequential database; and
    determining, based on the first number of instances and the second number of instances, the probability that the first user will execute the potential action immediately after executing the action subsequence.

5. The method of claim 1, wherein generating the second value includes:
    determining, based on the retention data, a first percentage of the historical users that continued to use the system after executing the potential action immediately after executing the action subsequence;
    determining, based on the retention data, a second percentage of the historical users that did not continue to use the system after executing the potential action immediately after executing the action subsequence; and
    determining, based on the first percentage and the second percentage, the probability that the first user will continue to use the system if the first user executes the potential action immediately after executing the action subsequence.

6. The method of claim 1, further comprising:
    identifying current action sequences being executed by the first user, wherein the identified action subsequence is included within the current action sequences.

7. The method of claim 6, further comprising:
    determining a highest scoring action of the plurality of potential actions based on the confidence scores;
    generating at least one recommended action for the first user, the at least one recommended action including the highest scoring action;
    providing the at least one recommended action to the first user;
    receiving, from the first user, an indication of a selected action of the at least one recommended action; and
    redirecting the first user to an interface for executing the selected action.

8. A method for scoring potential actions, the method performed by one or more processors of a system and comprising:
    extracting, from a validation database, a recent action sequence executed by a recent user;
    identifying, within the recent action sequence, a recent action subsequence executed by the recent user, wherein the validation database indicates an actual action executed by the recent user immediately after executing the action subsequence;
    generating, for each respective potential action of a plurality of potential actions, using a trained machine learning model, a first value indicating a probability that the recent user will execute the respective potential action immediately after executing the action subsequence, generating the first value including:
        determining a first number of instances that the recent action subsequence appears in a sequential database indicating historical actions executed by historical users,
        determining a second number of instances that the respective potential action appears immediately after the recent action subsequence in the sequential database, and
        determining, based on the first number of instances and the second number of instances, the probability that the recent user will execute the respective potential action immediately after executing the recent action subsequence;
    generating, for each respective potential action of the plurality of potential actions, using the trained machine learning model, a second value indicating a probability that the recent user will continue to use the system if the recent user executes the respective potential action immediately after executing the action subsequence, generating the second value including:
  determining, based on retention data indicating whether the historical users continued to use the system after executing the historical actions, a first percentage of the historical users that continued to use the system after executing the respective potential action immediately after executing the recent action subsequence,
  determining, based on the retention data, a second percentage of the historical users that did not continue to use the system after executing the respective potential action immediately after executing the recent action subsequence, and
  determining, based on the first percentage and the second percentage, the probability that the recent user will continue to use the system if the recent user executes the respective potential action immediately after executing the recent action subsequence; and
generating, for each respective potential action of the plurality of potential actions, using the trained machine learning model, a confidence score indicating a likelihood that recommending the respective potential action to the recent user will result in the recent user continuing to use the system, the confidence score generated based on the first value and the second value; and
determining an accuracy of the trained machine learning model based at least in part on the actual action executed by the recent user and the generated confidence scores.

9. A method for predicting a next best action for a current user, the method performed by one or more processors of a system and comprising:
  extracting a current action sequence from current actions being executed by a current user in real-time;
  identifying, within the current action sequence, a current action subsequence including a particular series of the current actions executed by the current user in order;
  generating, for each respective potential action of a plurality of potential actions, using a trained machine learning model, a first value indicating a probability that the current user will execute the respective potential action immediately after executing the current action subsequence based on numbers of instances that historical users executed the respective potential action immediately after executing the current action subsequence;
  generating, for each respective potential action of the plurality of potential actions, using the trained machine learning model, a second value indicating a probability that the current user will continue to use the system if the current user executes the respective potential action immediately after executing the current action subsequence based on whether the historical users continued to use the system after executing the respective potential action immediately after executing the current action subsequence;
  generating, for each respective potential action of the plurality of potential actions, using the trained machine learning model, a confidence score indicating a likelihood that recommending the respective potential action to the current user will result in the current user continuing to use the system, the confidence score generated based on the first value and the second value; and
  generating, in at least near real-time with the current user's execution, at least one recommended action for the current user based on the confidence scores.

10. The method of claim 9, further comprising:
  determining a highest scoring action of the plurality of potential actions based on the confidence scores, wherein the at least one recommended action includes the highest scoring action;
  providing the at least one recommended action to the current user;
  receiving, from the current user, an indication of a selected action of the at least one recommended action; and
  redirecting the current user to an interface for executing the selected action.

11. A system for scoring potential actions, the system comprising:
  one or more processors; and
  a memory storing instructions that, when executed by the one or more processors, causes the system to:
    generate a sequential database indicating historical actions executed by historical users;
    retrieve retention data indicating whether the historical users continued to use the system after executing the historical actions;
    provide the sequential database and the retention data to a machine learning model;
    identify an action subsequence executed by a first user;
    generate a validation database indicating recent action sequences executed by recent users, the identified action subsequence included within the recent action sequences, and the validation database indicating actual actions executed by previous users immediately after executing the action subsequence;
    generate, for each of a plurality of potential actions, using the machine learning model, a first value indicating a probability that the first user will execute the potential action immediately after executing the action subsequence based on the actual actions executed by previous users;
    generating, for each respective potential action of the plurality of potential actions, using the machine learning model, a second value indicating a probability that the first user will continue to use the system if the first user executes the potential action immediately after executing the action subsequence based at least in part on the retention data; and
    generating, for each respective potential action of the plurality of potential actions, using the machine learning model, a confidence score indicating a likelihood that recommending the potential action to the first user will result in the first user continuing to use the system, the confidence score generated based on the first value and the second value.

12. The system of claim 11, wherein execution of the instructions further causes the system to:
  extract historical action sequences from the sequential database, wherein the identified action subsequence is included within the historical action sequences; and
  determine, for each of the historical action sequences, a number of instances that the historical action sequence appears in the sequential database, wherein generating the first value and the second value is based at least in part on the numbers of instances.

13. The system of claim 11, wherein execution of the instructions further causes the system to:

provide the validation database to the machine learning model; and determine an accuracy of the machine learning model based at least in part on the validation database.

14. The system of claim 11, wherein generating the first value includes:

determining a first number of instances that the action subsequence appears in the sequential database;

determining a second number of instances that the potential action appears immediately after the action subsequence in the sequential database; and determining, based on the first number of instances and the second number of instances, the probability that the first user will execute the potential action immediately after executing the action subsequence.

15. The system of claim 11, wherein generating the second value includes:

determining, based on the retention data, a first percentage of the historical users that continued to use the system after executing the potential action immediately after executing the action subsequence;

determining, based on the retention data, a second percentage of the historical users that did not continue to use the system after executing the potential action immediately after executing the action subsequence; and determining, based on the first percentage and the second percentage, the probability that the first user will continue to use the system if the first user executes the potential action immediately after executing the action subsequence.

16. The system of claim 11, wherein execution of the instructions further causes the system to:

identify current action sequences being executed by the first user, wherein the identified action subsequence is included within the current action sequences.

17. The system of claim 16, wherein execution of the instructions further causes the system to:

determine a highest scoring action of the plurality of potential actions based on the confidence scores;

generate at least one recommended action for the first user, the at least one recommended action including the highest scoring action;

provide the at least one recommended action to the first user;

receive, from the first user, an indication of a selected action of the at least one recommended action; and redirect the first user to an interface for executing the selected action.

* * * * *